United States Patent
Singh

(10) Patent No.: US 7,246,055 B1
(45) Date of Patent: Jul. 17, 2007

(54) OPEN SYSTEM FOR SIMULATION ENGINES TO COMMUNICATE ACROSS MULTIPLE SITES USING A PORTAL METHODOLOGY

(75) Inventor: Raminderpal Singh, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 722 days.

(21) Appl. No.: 09/649,193

(22) Filed: Aug. 28, 2000

(51) Int. Cl.
  G06F 13/10 (2006.01)
  G06F 15/16 (2006.01)
  G06F 7/10 (2006.01)
  G06F 17/50 (2006.01)
  G06F 9/44 (2006.01)

(52) U.S. Cl. .................. 703/20; 709/217; 707/10; 716/4; 717/104

(58) Field of Classification Search ............ 703/20; 707/10; 716/1, 4; 717/104; 709/217
  See application file for complete search history.

(56) References Cited

U.S. PATENT DOCUMENTS

| | | | | |
|---|---|---|---|---|
| 4,694,411 | A * | 9/1987 | Burrows | 703/14 |
| 5,604,895 | A * | 2/1997 | Raimi | 703/13 |
| 5,815,683 | A * | 9/1998 | Vogler | 709/217 |
| 5,918,054 | A * | 6/1999 | Jury et al. | 717/175 |
| 6,038,668 | A * | 3/2000 | Chipman et al. | 726/30 |
| 6,058,395 | A * | 5/2000 | Buzaglo et al. | 707/10 |
| 6,098,068 | A * | 8/2000 | Brown | 707/10 |
| 6,148,432 | A * | 11/2000 | Brown | 716/1 |
| 6,157,947 | A * | 12/2000 | Watanabe et al. | 709/217 |
| 6,256,664 | B1 * | 7/2001 | Donoho et al. | 709/204 |
| 6,292,765 | B1 * | 9/2001 | Ho et al. | 703/14 |
| 6,295,513 | B1 * | 9/2001 | Thackston | 703/1 |
| 6,594,799 | B1 * | 7/2003 | Robertson et al. | 716/1 |
| 6,687,748 | B1 * | 2/2004 | Zhang et al. | 709/223 |

FOREIGN PATENT DOCUMENTS

WO    WO 98/52144    * 11/1998

OTHER PUBLICATIONS

WO 98/52144 "Web-Enabled System and Method for Designing and Manufacturing Laser Scanners".*
Dalpasso-M et al. "Virtual Simulation of Distributed IP-based Designs" (1999). ACM Press, p. 50-55.*
McQuay, W.K. "A Collaborative Engineering Environment for 21st Century Avionics" 1998. IEEE p. 255-262.*
Dalpasso et al., "Virtual Simulation of Distributed IP-based Designs" 1999. ACM p. 50-55.*
Greenberg et al., "A System Software Architecture for High-End Computing" IEEE/ACM 1997 abstract p. 1.*
Berry et al., "Toward Automatic State Management for Dynamic Web Services" 1999 Duke University p. 1-13.*

* cited by examiner

Primary Examiner—Anthony Knight
Assistant Examiner—Tom Stevens
(74) Attorney, Agent, or Firm—Bingham McCutchen LLP

(57) ABSTRACT

An open system for multiple discrete, geographically disperse simulation engines to communicate with each other across a distributed electronic network, such as the Internet, comprises a portal accessible to the simulation engines over the network. Local portions of the simulation may be run separately by each simulation engine, and the output data files are stored on and managed by the portal. A co-simulating engine may request an output data file stored by the portal and use that data as input for its downstream portion of the simulation. In this fashion, multiple geographically disperse simulation engines can test bench their designs in an open, network centric simulation environment.

44 Claims, 12 Drawing Sheets

OPEN SYSTEM FOR SIMULATION ENGINES TO COMMUNICATE ACROSS MULTIPLE SITES USING A PORTAL METHODOLOGY

BACKGROUND OF THE INVENTION

1. Field of the Invention

The field of the present invention generally relates to computer-based design simulation and, more particularly, to systems and methods for running relatively large and/or complex simulations on geographically disperse computers connected via network.

2. Related Art

Simulation engines are currently used in many technology areas, from electronics to automotive applications to aerospace. The complexity of these and other technology areas has grown tremendously over the past decades, outpacing the growth of mere desktop computing power. An example of this growth in complexity is reflected by the recent upgrading of the Hubble telescope, performed by NASA to update the telescope's electronic equipment. Details of this NASA-sponsored space mission may be found at NASA's web site. Prior to the launch of the NASA-sponsored space mission, both the new electronic equipment for the telescope and the procedure for changing the equipment would likely have been simulated many times by multiple computers. These simulations would likely have been overseen by teams of engineers from different disciplines and even different companies.

Another example of growing technical complexities is reflected by the failure of a recent NASA Mars mission in 1999, which has been attributed to use of incompatible metric and U.S.-standard measurement scales. This mission failure could potentially have been avoided with cross-team simulations prior to the mission.

While technologies are growing in complexity and leading to challenges in conducting simulations, engineering design teams are becoming more geographically fragmented. For example, several different design teams working on the same project may be located in different cities, in different countries, or even on different continents. This geographic diversity presents additional challenges in conducting simulations that require participation or programming input from multiple engineering teams.

For example, today's engineers who may design an integrated circuit ("IC") for a semiconductor chip generally use simulation tools to simulate their designs for testing purposes. With IC design becoming very complex, geographically disperse teams are increasingly common so as to take advantage of design talent spread across the world. One project may consist of several components and a separate group may be designing each component. These groups may be physically spread out from India to the United States. Typically, each group will independently creates create and simulate its respective component. It is usually not until late in the functional design cycle, after a considerable portion of the project work has been completed, that the separate groups bring the components designs together for full IC simulation.

These separate design groups, which are each creating different components of the overall system, may wish to find out if their respective component will simulate correctly with the overall IC design. Traditionally, each such design group would need to access the overall IC design while it is off-line, and then set up and prepare for a full IC simulation with that group's particular component included. This process is typically very cumbersome, because it involves both a considerable set up effort and large amounts of data transfer. Additionally, a full simulation early in the design process necessarily involves inter-group communications that can lead to delays, especially with time zone differences and possible language barriers.

As the need for large complex simulations continues to grow, the likelihood of collaboration among engineering teams located in remote geographical sites increases. Large-scale simulations are more and more commonly being executed on discrete computers that may be widely dispersed geographically, yet connected together through various communications links. Although simulation across multiple geographic sites is theoretically possible using conventional technology and methodologies, those methodologies generally require the use of specialized network tools or equipment that can be expensive to design or acquire.

Using a proprietary model, a typical example of which is depicted conceptually in FIG. 1 can be very restrictive for global design projects, especially as complexities of the simulation and economic demands grow. In a conventional proprietary model, a single computer 10 runs a master simulation engine with primary responsibility to execute and synchronize the simulation. Additional computers 20, 24, and 28 with remote simulation engines are connected to the master simulation engine at computer 10 by proprietary communication links 14. All of the simulation engines can thereby participate in the simulation, but they must do so through the proprietary communication links 14. Furthermore, the master simulation engine at computer 10 may bear the additional burden of synchronizing the simulation.

Using this type of proprietary model, conventional simulations allow participating simulation engines to communicate with each other. For example, a SPICE™ simulation of an analog block may communicate with a number of Verilog® simulations of digital blocks. However, because conventional networked simulations generally take place using a proprietary model, they necessarily require pre-established relationships.

Therefore, a need exists for a more flexible and universally accessible system whereby discrete, geographically dispersed simulation engines can communicate with one another.

SUMMARY OF THE INVENTION

One aspect of the present invention is generally directed towards an open system that facilitates communication between simulation engines that may be physically located in dispersed geographical locations, and allows those simulation engines to collectively participate in a simulation event.

In one embodiment, a simulation portal is provided in connection with a network-accessible computer. The simulation portal is preferably accessible by any simulation engine running on a computer that is connected to the network and has the necessary access permissions, if required. The simulation portal may exist on a computer connected to a global electronic network and may allow access to any other connected computer capable of providing a particular network service, for example, the World Wide Web ("Web") or the File Transfer Protocol ("FTP"). Such access may allow a simulation engine running on a network connected computer to access a simulation. Multiple simulation engines from remote geographic locations can thereby interact and cooperate through the simulation portal to perform a large simulation.

One feature that may be provided by the simulation portal is an openly accessible repository. Simulation engines running on computers that have network access to the simulation portal have the ability to take part in simulations that are managed through the simulation portal, drawing upon the resources of the simulation repository. Generally, the simulation portal uses commonly accessible files, such as UNIX® mailbox files, to manage a particular simulation. Such files can be used to store synchronization information regarding the timing steps of the individual simulation engines and to store simulation output data that may be subsequently used as input by a co-simulating simulation engine.

Additionally, the repository may contain synchronization and data files for a plurality of simulations. This may allow multiple simultaneous simulations to be managed by a single simulation portal. Simulations that are managed by the simulation portal can be in real time or in serial time. Real time simulations preferably take place during a time in which there is minimal network delay. Serial time simulations, however, may take place over an extended period of time, such that the output from one simulation engine's contribution to the simulation is stored by the simulation portal and later used as input to another simulation engine's portion of the simulation. In this fashion, the flexible and universally accessible simulation portal may facilitate communication and cooperation between each discrete simulation engine taking part in a collective simulation.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE INVENTION

Certain embodiments as disclosed herein provide for an "open system" for discrete simulation engines to communicate cooperatively with each other across a network. However, although various embodiments of the present invention will be described herein or illustrated in the accompanying drawings, it is understood that these embodiments are presented by way of example only, and not limitation. As such, this detailed description of various embodiments and the accompanying drawings should not be construed to limit the scope or breadth of the present invention, as set forth in the appended claims, in any way.

Figure 1:
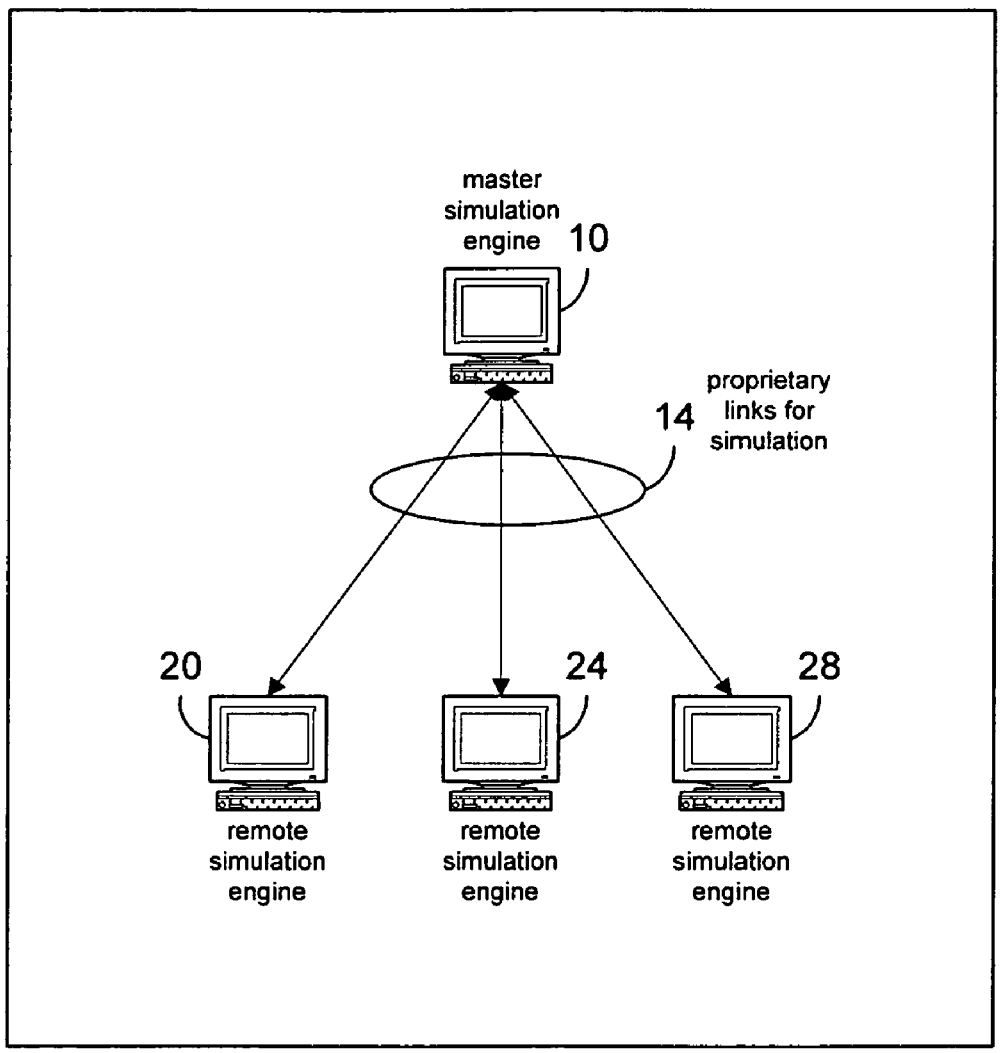
FIG. 1 is a top level block diagram depicting an example of a conventional simulation environment as currently known in the art.
Figure 2:
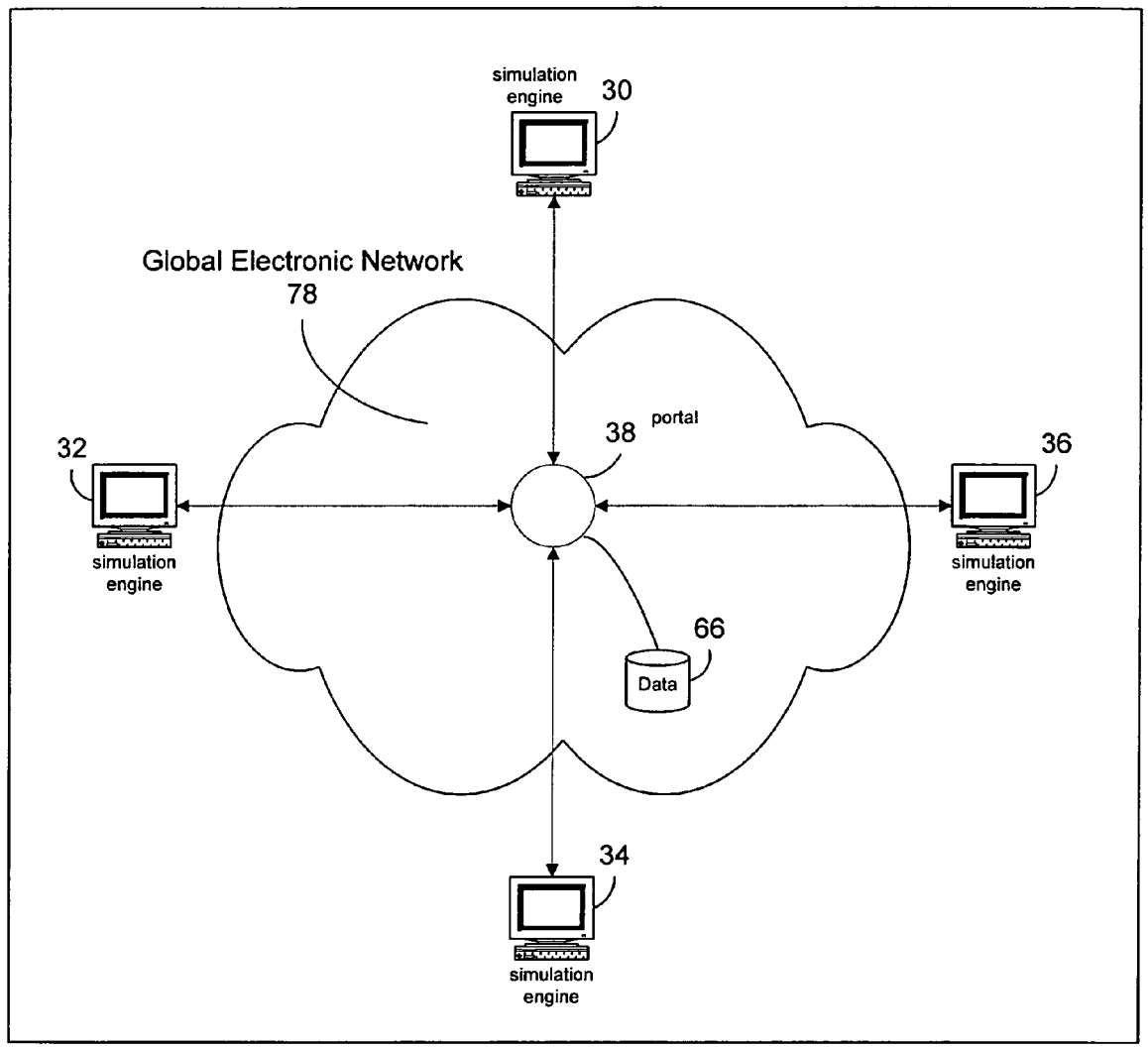
FIG. 2 is a top level block diagram illustrating an example of a preferred embodiment of a simulation architecture as disclosed herein.

FIG. 2 is a block diagram illustrating an exemplary simulation environment according to one embodiment as disclosed herein. A plurality of computers, such as computers 30, 32, 34, and 36, are preferably connected to a distributed electronic network 78. Any number of computers may be connected to or may participate in a simulation over the distributed electronic network 78. In FIG. 2, only four computers are shown for purposes of illustration.

In one embodiment, coordinated simulation engines may run on computers 30, 32, 34, and 36. Furthermore, the simulation engines running on computers 30, 32, 34, and 36 may advantageously join together to create a convenient simulation environment for large, complex simulations. For example, simulation engines running on computers 30, 32, 34, and 36 may join together and communicate with each other through a simulation portal 38.

Figure 7:
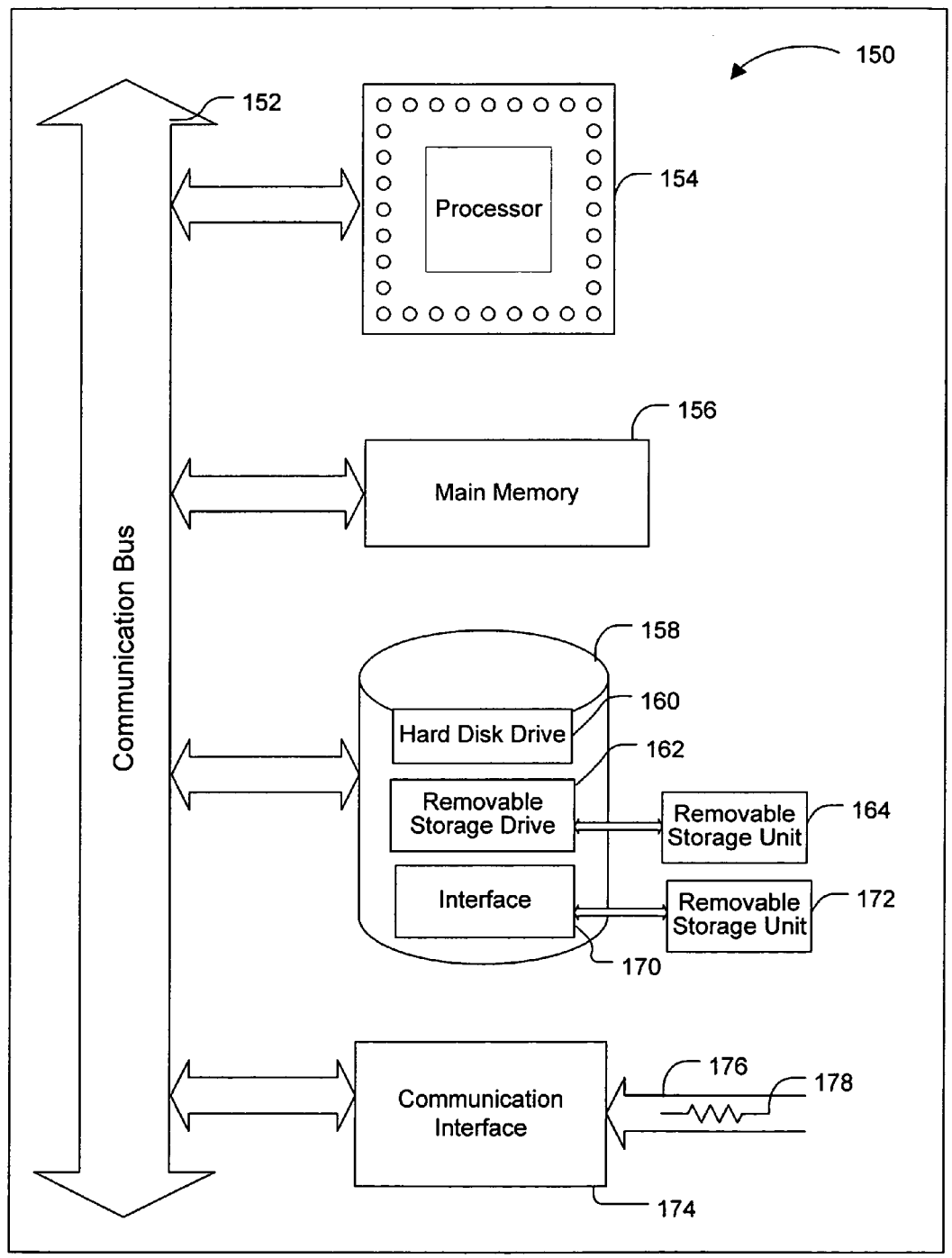
FIG. 7 is a block diagram illustrating an exemplary computer system as may be used in connection with various embodiments described herein.

The simulation portal 38 may be implemented by program instructions running on a computer—for example, a computer 150 as illustrated in FIG. 7 and described later herein. Preferably, the computer providing the simulation portal 38 is also connected to the distributed electronic network 78 that connects computers 30, 32, 34, and 36. The distributed electronic network 78 may be a global electronic network (e.g. the Internet), a local area network ("LAN"), a wide are network ("WAN"), or an intranet. Additionally, the distributed electronic network 78 may comprise a wireless communication network connecting wireless devices running the simulation engines and/or the simulation portal 38.

In one embodiment, the simulation portal 38 may include a data storage area 66 to store synchronization information and data files for particular simulation events being managed by the simulation portal 38. One example of a data storage area 66 may be mailboxes such as those used in a typical UNIX® or Linux® system. The data storage area 66 (e.g. mailboxes) may be used to facilitate the communications between the simulation engines running on computers 30, 32, 34, and 36 during a simulation event.

Alternatively, the data storage area 66 may be a database constructed to house the simulation data that is maintained by the simulation portal 38 for a particular simulation event. For example, a simulation of a design with two components, e.g. a front end component and a back end component, may store simulation output for the front end component in a database managed by simulation portal 38. Such simulation output may then be stored in the data storage area 66 and made available to a designer of the back end component.

In an alternative embodiment, the data storage area 66 may comprise a hierarchical file system and directory structure. For example, data files may be stored as files in the directories of a hierarchical file system and organized such that each simulation managed by the simulation portal 38 has a unique directory. Other similar means for storing simulation related information in data area 66 may also be employed by the simulation portal 38 without departing from the present invention, as will be apparent to those skilled in the art.

Figure 2A:
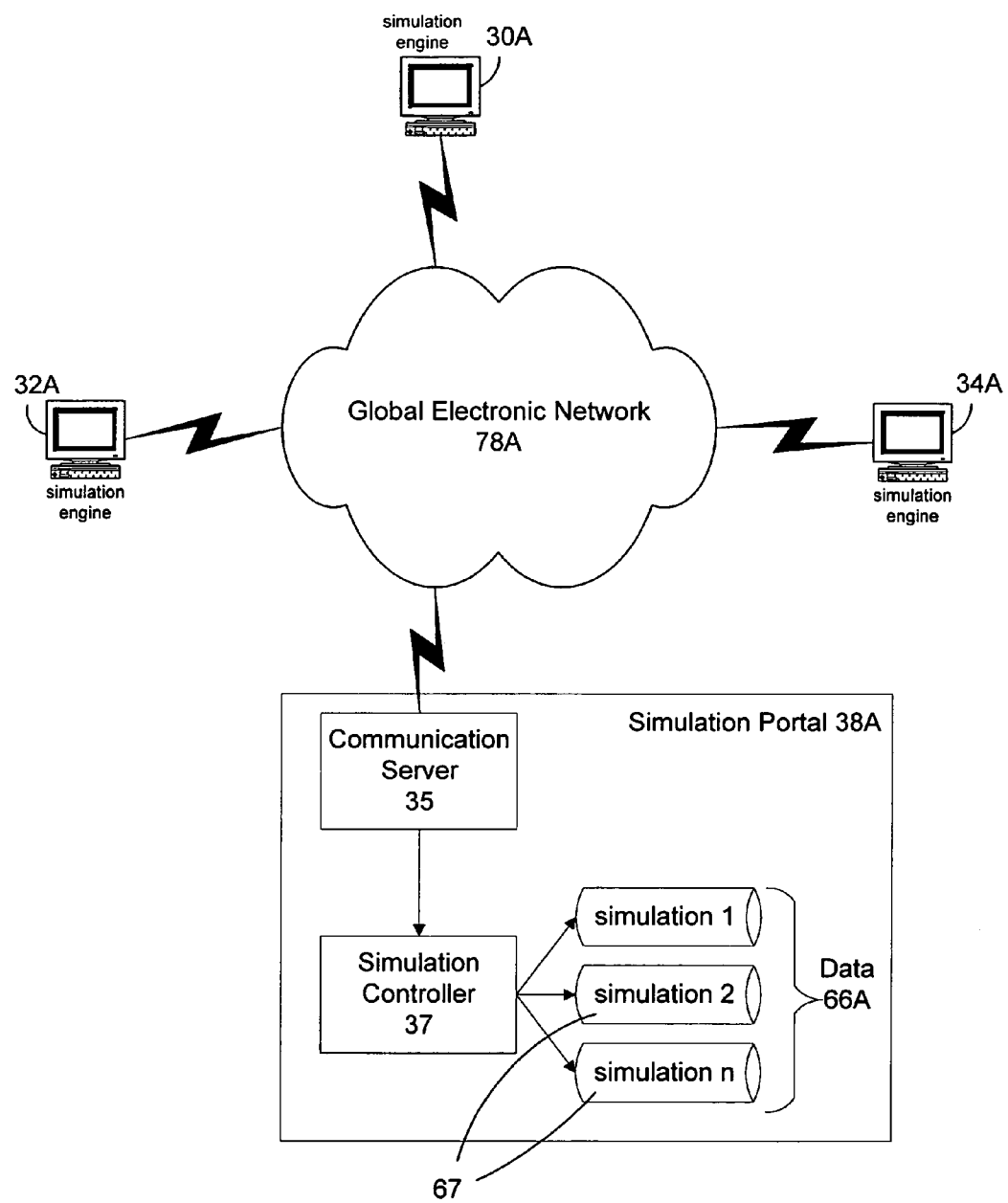
FIG. 2A is a top level block diagram illustrating an example of a preferred embodiment of a simulation portal as disclosed herein.

FIG. 2A is a conceptual diagram illustrating an exemplary simulation portal 38 according to one embodiment as disclosed herein. Computers 30A, 32A, and 34A are preferably communicatively connected with simulation portal 38A through a global electronic network 78A. Simulation portal 38A may comprise a communication server 35, a simulation controller 37 and a data storage area 66A. Data storage area 66 may physically or logically comprise a plurality of discrete storage areas 67. In one embodiment, each simulation event being simultaneously managed by the simulation portal 38A may have a discrete storage area 67 within data storage area 66A.

Communication server 35 is preferably tasked with managing the connections with the various simulation engines running, for example, on computers 30A, 32A, and 34A. In one embodiment, these connections may be made over global electronic network 78A using standard TCP/IP protocols. For example, a TCP port may be designated for the simulation portal 38A such that any connections requesting the particular port can be directed to the simulation portal 38 for a session.

Alternatively, connections to the simulation portal 38A may be made using the Hyper Text Transfer Protocol ("HTTP") or the File Transfer Protocol ("FTP"), both of which are well known in the art. Preferably, communication server 35 processes requests based on any of these or any other communication protocol available for use on global electronic network 78A. A variety of other means for establishing connections with the simulation portal 38A may be used without departing from the present invention—for example, a direct physical connection or a wireless connection.

In one embodiment, the simulation controller 37 manages the various simulations that may be in progress through the simulation portal 38A at any given time. For example, simulation controller 37 may run a username and password verification process prior to allowing a requesting simulation engine access to the data pertaining to a particular simulation. Additionally, simulation controller 37 may manage the discrete storage areas 67 of data storage area 66A such that the integrity of synchronization information and data is maintained across all simulations.

A simulation portal 38 (or 38A) may be created by any of several parties. In one embodiment, a simulation portal 38 may be created by the party running a simulation engine at computer 30, 32, or 34. In such a case, the party creating the simulation portal 38 would likely participate in the simulation. Alternatively, a simulation portal 38 may be created by a third party that does not plan to participate in the simulation. Such a party may be, for example, a systems integrator or an IP broker.

In one embodiment, the simulation portal 38 is hosted or managed by a third party that is not a participant in the simulation. For example, the third party may create the simulation portal 38, make it openly available over the Internet or other distributed electronic network, and require a username and password combination to access the simulation portal 38. The owner of the simulation portal 38 may then seek interested design teams and provide each design team access to a simulation through the simulation portal 38. The host or manager of the simulation portal 38 may thereby act as a "broker" by soliciting competing design teams to simulate component designs through the simulation portal 38 in order to determine the optimal combination of components for the overall system.

In an alternative embodiment, the simulation portal 38 may be hosted or managed by a systems integrator. For example, the systems integrator may initiate the simulation portal 38, make it openly available over an electronic network, and allow access to any interested design teams. The individual design teams, located at remote computers 30, 32, and 34 running simulation engines, may then simulate their component designs through simulation portal 38. The systems integrator may then select the optimal performing components from the pool of designs for each component.

A simulation portal 38 (or 38A) may be created in a computer programming language such as XML, HTML, C, C++, Java™, JavaScript™ or any other suitable programming language, as will be apparent to those skilled in the art. In one embodiment, a simulation portal 38 may be created dynamically by writing or editing the necessary programming files and executing those files. In an alternative embodiment, a simulation portal 38 may be created by executing an existing application that provides the functionality of the simulation portal 38.

Specific characteristics of the simulation portal 38 (or 38A) may be configured when the simulation portal 38 is created or while the simulation portal 38 is in operation. For example, a network communications port may be assigned to the simulation portal 38 at the time the application is launched—for example, through the use of a variable input or switch. In an alternative embodiment, an environment variable or a configuration file may be used to modify the simulation portal 38 characteristics while the simulation portal 38 is in operation.

Once the simulation portal 38 (or 38A) has been created, a simulation may commence. In one embodiment, multiple parties may participate in a single simulation. For example, simulation of a complete design may involve the simulation of a front end component and a back end component, which are part of the overall design. A front end component of a particular design may be, e.g., a radio frequency ("RF") device for a wireless communications device. A back end component of the design may be, e.g., a digital signal processor ("DSP") for the same wireless communications device. In a simulation, the front end component and the back end component (i.e., the RF device and the DSP) may be separately simulated. However, the simulation of the DSP device may use the output from the simulation of the RF device as input for the DSP simulation.

A simulation may begin at the simulation engine running on one of the computers connected to the distributed electronic network (e.g., computer 30), which may be the simulation engine for a front end component, such as, according to the above example, an RF device. The simulation engine may run the RF device through a simulation and direct the output to a particular file. The content format for an output file created by a simulation may vary according to the simulation tool being used. For example, a commonly used format for simulation data is the SPICE™ format. Upon completion of the front end RF device simulation, the simulation engine running on computer 30 may connect to the simulation portal 38 to participate in the larger system simulation. At that point, the output file may be stored at the data storage area 66 of the simulation portal 38, so that it is accessible to others involved in the simulation.

Access to the simulation portal 38 (or 38A) may be open or restricted. In one embodiment, open access is provided to any simulation engine with the ability to connect to simulation portal 38 via the global electronic network 78. Alternatively, access to simulation portal 38 may be restricted to those simulation engines with a particular username and password combination, in addition to the ability to connect to simulation portal 38.

In one embodiment, the simulation portal 38 (or 38A) may be publicly available over the Internet. In a particular example, explained with reference to FIG. 2A, simulation portal 38A includes communication server 35 using the extensible markup language ("XML") or a similar open ended data transmission format to send and receive data. Access to simulation portal 38A may be gained through a variety of available protocols. In one embodiment, a proprietary protocol may be used by simulation portal 38A to restrict access and secure communications. Alternatively, several well known protocols may be used by simulation portal 38A such as the well-known Hypertext Transfer Protocol ("HTTP") or the File Transfer Protocol ("FTP"). For example, access to simulation portal 38A may be gained using a standard World Wide Web ("Web") browser, which uses the HTTP communication protocol. Any simulation engine with network access to the simulation portal 38A, regardless of geographic location, may connect to the simulation portal 38A using the appropriate communication protocol and thereby participate in an open simulation.

In one embodiment, a proprietary communication protocol may be used in tandem with open access to the simulation portal 38A to facilitate the use of a particular suite of design products that produce a common output format. Access to the simulation portal 38A may thereby be limited to those simulation engines that can communicate using the proprietary protocol and that are running on the computers that have network access to the simulation portal 38A. For example, simulation portal 38A may include a communication server 35 that uses XML to implement a proprietary communication protocol. In such an embodiment, although simulation portal 38A may be electronically accessed via global electronic network 78A, only those simulation engines that can communicate with the proprietary protocol may participate in the open simulation.

Participation in a simulation may involve various activities, depending on the particular contribution the simulation engine may make. In one embodiment, once the simulation engine running on computer 30A has connected to simulation portal 38A, the simulation engine may upload its simulation output file for the front end RF component. After the simulation output file has been uploaded to simulation portal 38A, computer 30A may terminate its connection to simulation portal 38A. For example, the simulation engine running on computer 30A may log out from simulation portal 38A. Alternatively, computer 30A may close a browser window to end its connection with simulation portal 38A.

Referring again to FIG. 2A, the file uploading process may be managed by simulation controller 37 such that the simulation files are appropriately stored and allocated to the proper simulation storage area 67 of the data storage area 66A. In one embodiment, simulation controller 37 may manage simulation files and data through the use of text files in a hierarchical file system. Alternatively, simulation controller 37 may manage simulation files and data through the use of standard mailbox files, for example those used in a typical UNIX® system. Other alternative means for managing and storing simulation files and data may also be employed by simulation controller 37, without departing from the present invention.

In addition to computer 30A connecting to simulation portal 38A to conduct a portion of a larger simulation, other simulation engines may also connect to simulation portal 38A in order to participate in the overall design simulation. For example, the simulation engine running on computer 32A may have been involved in the design of one of several alternative back end DSP components for the overall design. The simulation engine running on computer 32A may thus connect to simulation portal 38A, over a connection managed by communication server 35, in order to participate in a portion of the simulation relating to the back end DSP component. Once connected, the simulation engine running on computer 32A may download the simulation output file for the front end RF device, previously provided by the simulation engine running on computer 30A. This output file may then be used by the simulation engine running on computer 32A as input for a back end DSP simulation.

The simulation controller 37 may provide the simulation engine running on computer 32A with a list of available RF device simulation output files. One or more of these files may be selected for download. The downloading of the selected files may then be managed by simulation controller 37. Upon successfully downloading the simulation output file(s), computer 32A may or may not disconnect from simulation portal 38A. In one embodiment, the simulation engine running on computer 32A may run a back end DSP simulation after disconnecting from simulation portal 38A. Additionally, the output file provided by the front end RF simulation may be used as input for the back end DSP simulation. The other computers 32A and 34A, etc. may also participate in the simulation in a similar manner, provided they have the appropriate access permission.

There is no particular limit to the number of parties taking part in an open simulation. For example, any simulation engine running on a computer with access to a simulation portal 38 via a global electronic network 78 may participate in the simulation. After each party desiring to participate in the simulation has accessed simulation portal 38 and provided its contribution to the overall simulation, simulation portal 38 may be terminated. In one embodiment, simulation portal 38 may be terminated by stopping the simulation portal 38 program. Alternatively, simulation portal 38 may be terminated by disconnecting the computer running simulation portal 38 from global electronic network 78. Other means for terminating simulation portal 38 may be used, as will be apparent to those skilled in the art.

Simulations through the simulation portal 38 may take place in real time or serial time. A real time simulation takes place when each simulation engine involved in a simulation maintains a contemporaneous connection with the simulation portal 38 during the simulation process. In one embodiment, simulation engines running on computers 30, 32, and 34, may each be connected to the simulation portal 38 during the simulation. This real time connection allows the simulation engines to directly communicate with each other during the simulation process. This direct communication may be carried out by providing simulation input and output to the simulation portal 38, which stores the simulation input and output in database 66. Preferably, any communications delays introduced by the distributed electronic network 78 during a real time simulation are negligible.

Alternatively, the simulation portal 38 may handle simulations in serial time, without a need for contemporaneous connections with the simulation portal 38 by the various simulation engines. Serial access to the simulation portal 38 may be implemented by allowing simulation engines to participate in a simulation through the uploading of files to and downloading of files from the simulation portal 38. Advantageously, serial time simulation allows a simulation engine to minimize its required connection time with the simulation portal 38.

Figure 3:
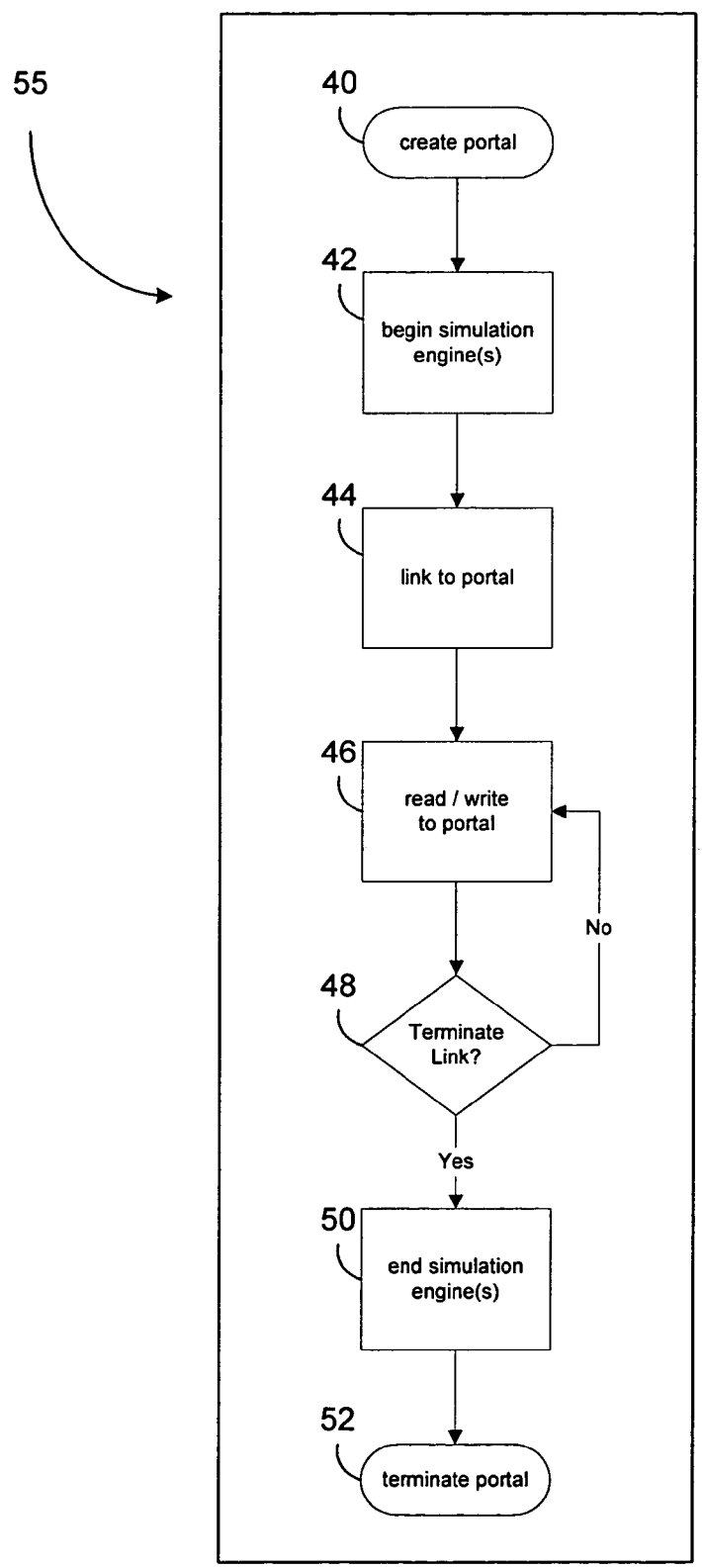
FIG. 3 is a flowchart representing an example of a process relating to a simulation session as may be carried out, for example, in the context of the simulation environment depicted in FIG. 2.

FIG. 3 is a flowchart representing an exemplary process 55 that a simulation using a portal methodology could employ in connection with various embodiments disclosed herein. The process 55 of FIG. 3 will be described for convenience with respect to the exemplary simulation environment of FIG. 2; however, it can also be used in a variety of other embodiments as well. As illustrated in step 40, the process 55 begins with the creation of a simulation portal 38 in step 40. The simulation portal 38 may have certain characteristics based on its intended use. For example, the simulation portal 38 may be openly accessible over a network 78. Alternatively, the simulation portal 38 may be restricted by a username and password combination. The network may be a global electronic network, e.g., the Internet, an intranet, or a wireless communications network. Furthermore, the simulation portal 38 may be created using XML, HTML, or any other suitable high level programming language such as C or C++ without departing from the present invention. In one embodiment, access to the simulation portal 38 is allowed using the HTTP protocol. Alternatively, access to the simulation portal 38 may be allowed using FTP or any other suitable network communication utility without departing from the present invention.

In step 42, the simulation engines that will take part in the simulation may begin. For example, a first simulation engine may begin by simulating a design of the front end RF component of a communications system. A second and any number of additional simulation engines may also begin at the same time or thereafter.

Once a simulation engine has initialized, the simulation engine may link to the simulation portal 38, as illustrated in step 44. Once a simulation engine has connected to the simulation portal 38, it may read from or write to the simulation portal 38, as previously described with respect to FIG. 2 or 2A. For example, the design team that simulated the front end RF component of a communications system may write the simulation output to the simulation portal 38 by uploading a SPICE™ output file. Similarly, a design team simulating a back end DSP component of a communications system may read the SPICE™ output file from the simulation portal 38 by downloading the file. The DSP design team may then simulate the DSP component using the data in the SPICE™ output file as input for the DSP simulation.

At any time after linking to the simulation portal 38, a simulation engine may terminate the link. For example, after the DSP design team has read the SPICE™ output file from the simulation portal 38, it may terminate its link with the simulation portal 38, as shown in step 48. However, a design team that has designed more than one component may elect to remain connected to the simulation portal 38 so that it may upload and download additional relevant simulation data files.

In one embodiment, once a simulation engine has terminated its link with the simulation portal 38, the simulation engine may terminate operation, as illustrated in step 50. For example, a design team that has only created a front end RF component for a communications system may have simulated that component and uploaded the SPICE™ output file to the simulation portal 38. Once the simulation engine corresponding to that design has terminated its link with the simulation portal 38, the simulation engine may not need to participate in the simulation any further. In such a case, the simulation engine may terminate operation after terminating its link with the simulation portal 38.

Once an entire simulation is complete, or at any other designated time, the simulation portal 38 may be terminated, as seen in step 52. In an alternative embodiment, a simulation portal 38 may last indefinitely such that it allows continuous access to design teams interested in simulating component design with data existing in the simulation portal 38. However, a simulation portal 38 may also be temporal and exist for only such time as is necessary to facilitate the simulation of the collaborative design. For example, once the components of a communication system have been simulated and the optimal configuration of components has been determined, the simulation portal 38 may be terminated.

Figure 4:
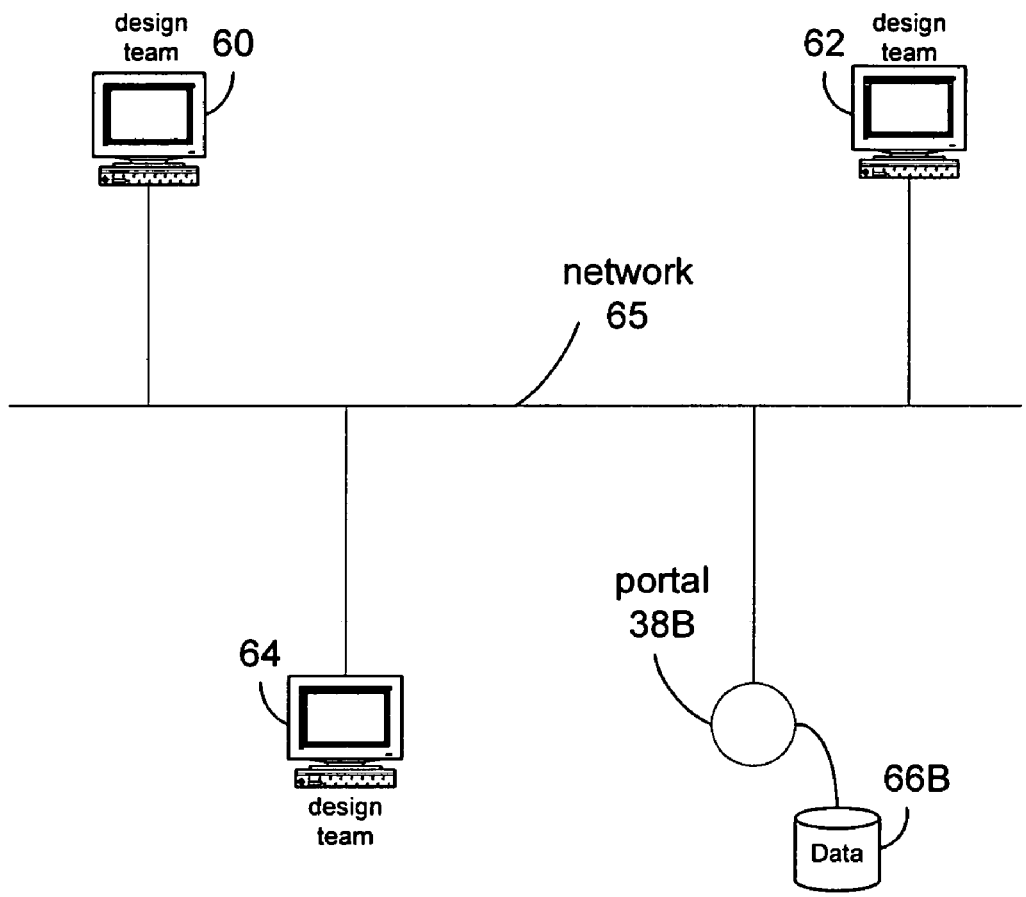
FIG. 4 is a block diagram illustrating one representation of an example of a simulation session using a simulation portal.

FIG. 4 is a block diagram illustrating an example of an open simulation environment implemented over an intranet. In this example, design teams at computers 60, 62, and 64 are each connected to an intranet network 65. For example, the intranet network 65 may be a network that serves a local corporation. Communication between the design teams at computers 60 62 and 64 may take place over the intranet network 65.

Also connected to the network is the simulation portal 38B. The simulation portal 38B may be openly accessible to any design team connected to the intranet network 65. Additionally, the simulation portal 38B is preferably configured with a text database 66B. Design teams at computers 60, 62, and 64 may communicate simulation data to each other through the simulation portal 38B. For example, the design team at computer 60 may run a simulation of a front end RF component for a communications device. The output of that simulation may be stored in a SPICE™ format simulation data file. Once the SPICE™ file is created, the design team at computer 60 may upload the file to the simulation portal 38B.

Additionally, design teams at computers 62 and 64 may each run a simulation of separate back end DSP components for a communications device. For example, design teams at computers 62 and 64 may connect to the simulation portal 38B and download the SPICE™ format simulation data file from the design team at computer 60. This data file may then be used by the design teams at computers 62 and 64 as input for their respective DSP component simulations.

Figure 5:
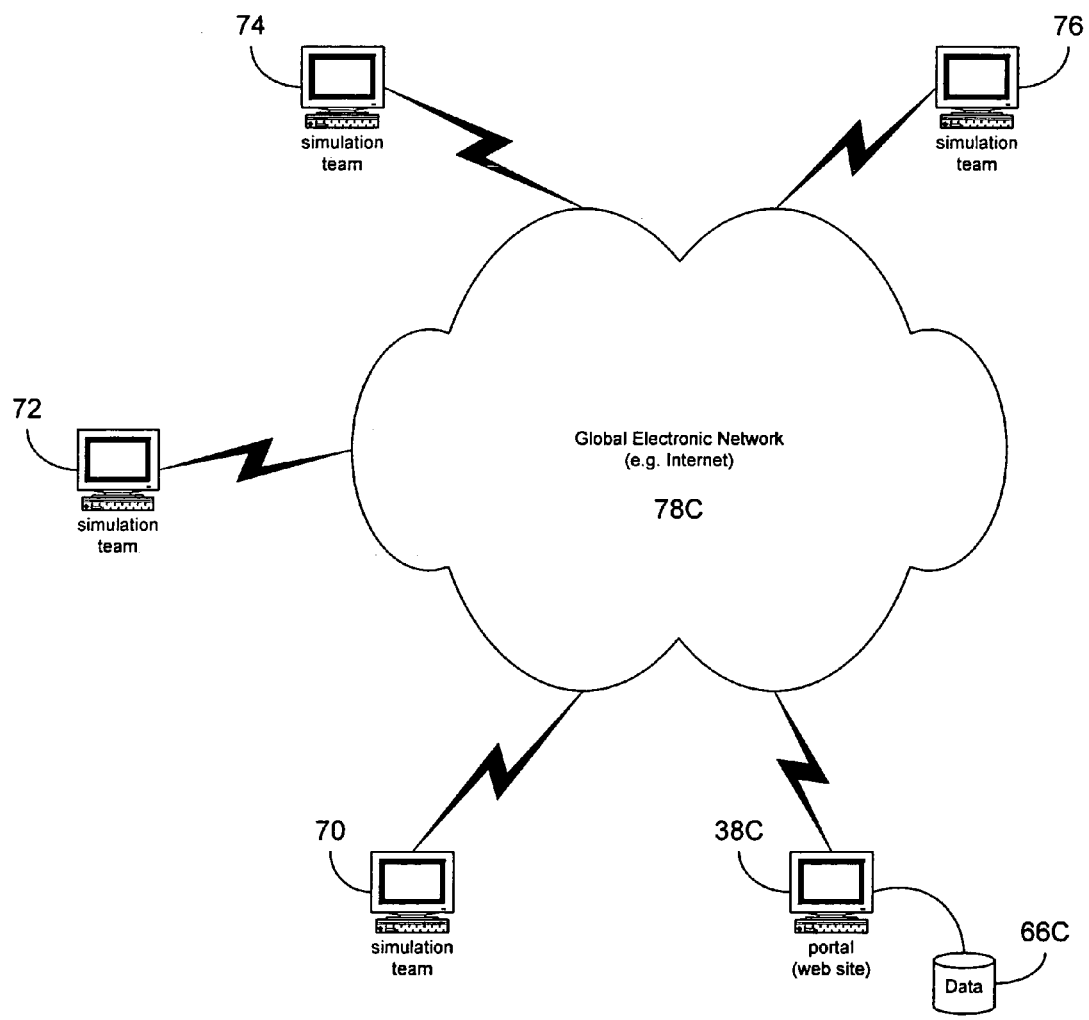
FIG. 5 is a block diagram illustrating another representation of an example of a simulation session using a simulation portal.

FIG. 5 is a block diagram illustrating an example of an open simulation environment implemented over a global electronics network, for example the Internet. In this example, simulation teams at computers 70, 72, 74, and 76 are each connected to a global electronic network 78C. Although only four simulation teams are depicted in the figure, any number of simulation teams may be connected to the global electronic network 78C. In one embodiment, the global electronic network 78C may be a network that is accessible to any communications device from any location. Communication between the simulation teams at computers 70, 72, 74, and 76 may take place over the global electronic network 78C.

Also connected to the network is the simulation portal 38C. The simulation portal 38C may include a data storage area 66C. In one embodiment, the simulation portal 38C is openly accessible to any design team connected to the global electronic network 78C. For example, the simulation portal 38 may be implemented using XML and the simulation portal 38C may support the HTTP protocol. Furthermore, the data storage area 66C may be a hierarchical directory system for storing simulation data files. Thus, any design team connected to the global electronic network 78C and supporting the HTTP protocol (e.g. any design team that is Web enabled) may access the simulation portal 38C. Therefore, by accessing the simulation portal 38C and writing data files to the data storage area 66C design teams at computers 70, 72, 74, and 76 may communicate simulation data to each other through the simulation portal 38C.

In one embodiment, the data storage area 66C may include a file system hierarchy of directories. This hierarchy may allow the simulation portal 38C to keep track of multiple simulations. For example, a first simulation may store its simulation data files in a discrete directory of the file system hierarchy. A second simulation may similarly store its simulation data files in a discrete directory of the file system hierarchy. Thus, both simulations may have discrete directories to store simulation data and at the same time share a common root level in the overall directory structure of the simulation portal 38C.

In an alternative embodiment, the data storage area 66C may additionally contain a synchronization file which allows participating simulation engines to match timing steps. Preferably, this file may be updated by each simulation engine as it simulates. The data storage area 66C may also contain output files for each simulation. For example, the data within these output files may advantageously be stored in a common text format such that other simulation engines may read and interpret the data contained within the output files.

In one embodiment, design teams at computers 70 and 76 may each run a simulation of a front end RF component for a communications device. The output of each simulation may be stored in a SPICE™ format simulation data file. Once the SPICE™ files have been created, design teams at computers 70 and 76 may each upload their respective simulation data file to the simulation portal 38C.

Additionally, design teams at computers 72 and 74 may each run a simulation of separate back end DSP components for a communications device. For example, design teams at computers 72 and 74 may connect to the simulation portal 38C and download the SPICE™ format simulation data files from design teams at computers 70 and 76, respectively. These simulation data files may then be used by design teams at computers 72 and 74 as input for their respective DSP component simulations.

Figure 6:
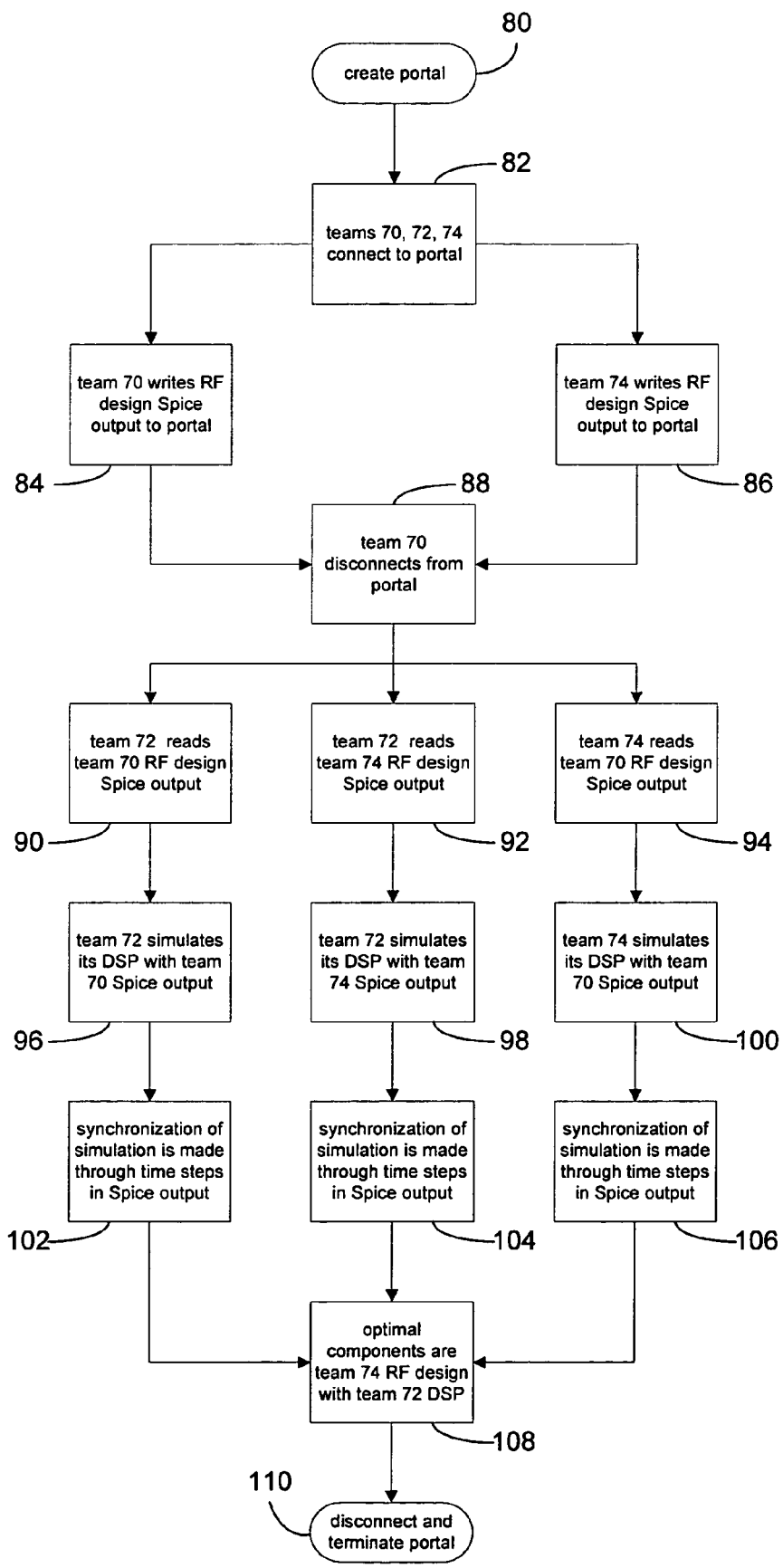
FIG. 6 is a flowchart representing an example of a process relating to a simulation session as may be carried out, for example, in the context of the simulation environment depicted in FIG. 5.

FIG. 6 is a flowchart representing an example of a process relating to a simulation session as may be carried out, for example, in the context of the simulation environment depicted in FIG. 5. In the example process illustrated in FIG. 6, three design teams at computers 70, 72, and 74 participate in an open simulation using a portal methodology. The teams may be connected by a global electronic network 78C, for example the Internet, and as such each team may be located in a different region of the world. For example, the team at computer 70 may be located in San Jose, Calif. Additionally, the team at computer 72 may be located in a geographical location some distance from the team at computer 70, for example, Scotland. Furthermore, the team at computer 74 may likewise be located in a geographical location some distance from the teams at computers 70 and 72, for example, India.

In addition to being geographically disperse, each team may also work for a separate corporate entity. For example, the team at computer 70 may work for company X, the team at computer 72 may work for company Y, and the team at computer 74 may work for company Z. In one embodiment, company X may have instructed the team at computer 70 to design an RF front end component for a communications system. Similarly, company Y may have instructed the team at computer 72 to design a DSP back end component for a communications system. Furthermore, company Z may have instructed the team at computer 74 to design both an RF front end component and a DSP back end component for a communications system.

Because each of the three teams is connected to the global electronic network 78C, the three teams are communicatively connected to each other. Additionally, each team may be designing a component or components of a communications system. For example, the team at computer 70 from San Jose may be designing an RF front end component for a communications system. The team at computer 72 from Scotland may be designing a back end DSP component, and the team at computer 74 from India may be designing both an RF front end component and a back end DSP component.

The open simulation may begin with the creation of the simulation portal 38C, as illustrated in step 80. The simulation portal 38C may be created on a computer that is connected to the global electronic network 78C. In one embodiment, the simulation portal 38C may be created using XML and be used to store text files in data storage area 66C. Data storage area 66C may consist of a database for storing text files. Alternatively, the simulation portal 38C may be created in XML and consist of a hierarchical directory system for storing files of any type.

Once the simulation portal 38C has been created, design teams at computers 70, 72, and 74 may connect to the simulation portal 38C. In one embodiment, the simulation portal 38C may be created to allow complete open access to any additional simulation teams that may desire to participate in the open simulation. Alternatively, the simulation portal 38C may be configured to require a username and password combination before allowing a simulation team access to the simulation portal 38C. Furthermore, the simulation portal 38C may be configured to communicate using the HTTP protocol. In one embodiment, the simulation portal 38C is accessible through a standard Web access utility.

Simulation teams that are connected to the simulation portal 38C may have read and write access to the simulation portal 38C. For example, in steps 84 and 86, the teams at computers 70 and 74 may each write their respective simulation output files to the simulation portal 38C. The format of the simulation output files may advantageously be a widely recognizable format that such as the industry standard SPICE™ format. Alternatively, the format of the output files may be proprietary. In one embodiment, simulation the teams at computers 70 and 74 may have generated their simulation output data files prior to connecting to the simulation portal 38C by simulating their RF components prior to connecting to the simulation portal 38C. Alternatively, the teams at computers 70 and 74 may simulate their respective RF designs while connected to the simulation portal 38C.

Once the team at computer 70 has written its SPICE™ data file to the simulation portal 38C, its participation in the simulation may be complete. For example, company X may have instructed the team at computer 70 to only design an RF component for a communications system. Therefore, after the team at computer 70 has simulated its component and provided the output of its component simulation to the simulation portal 38C, its contribution to the simulation may be complete. Thus, the team at computer 70 may disconnect from the simulation portal 38C after it has written its RF design SPICE™ output to the simulation portal 38C, as illustrated in step 88.

The teams at computers 72 and 74 may still be connected to the simulation portal 38C and therefore may read the SPICE™ output data files from the simulation portal 38C. For example, the team at computer 72 has designed a DSP back end component for a communications system and therefore may download from the simulation portal 38C the SPICE™ output files from the teams at computers 70 and 74, as illustrated in steps 90 and 92. Additionally, the team at computer 74 has also designed a DSP back end component for a communications system and may therefore download from the simulation portal 38C the SPICE™ output file from the team at computer 70, as shown in step 94.

Once the SPICE™ output files have been downloaded from the simulation portal 38C, simulations using the SPICE™ output files as data input may ensue. For example, the team at computer 72 may simulate its DSP back end component using the output file from the team at computer 70, as illustrated in step 96. Additionally, the team at computer 72 may simulate its DSP back end component using the output file from the team at computer 74, as illustrated in step 98. Advantageously, the team at computer 72 may compare the results of the separate simulations to determine which RF component design performs optimally with its DSP component design. Furthermore, the team at computer 74 may simulate its DSP back end component using the output file from the team at computer 70, as illustrated in step 100.

In one embodiment, each of the teams simulating a DSP back end component using a SPICE™ output file downloaded from the simulation portal 38C may synchronize the simulation through the use of time steps that may be advantageously contained in the SPICE™ output file, as shown in steps 102, 104, and 106. For example, the simulation of the RF front end component by the team at computer 70 may have incorporated time steps within the data of the SPICE™ output file. Therefore, when the team at computer 72 simulates its DSP back end component using the SPICE™ output file from the team at computer 70, the DSP simulation may synchronize its timing as if the two simulation processes were communicating in a run-time simulation environment.

In one embodiment, once the simulations are complete, the optimal components may be selected for incorporation into the final system design. For example, the team at computer 74 RF front end component design may be the best match for the team at computer 72 DSP back end component design, as illustrated in step 108.

In an alternative embodiment, the optimal configuration may be determined by a systems integrator who examines the simulation output files for each combination of components. For example, the teams at computers 72 and 74 may upload to the simulation portal 38C the final output files from each of their DSP back end component simulations. Thus, a systems integrator may select the two components that are most suitable for integration into the overall design. In one embodiment, a systems integrator may select the optimal component designs and purchase the IP from the respective companies of the component design teams.

In step 110, the teams at computers 72 and 74 may disconnect from the simulation portal 38C and the simulation portal 38C may terminate. Alternatively, the teams at computers 72 and 74 may have disconnected from the simulation portal 38C after downloading the SPICE™ output files in steps 90, 92, and 94. Advantageously, this may allow the teams to perform their DSP back end component simulations while off-line. In an alternative embodiment, the teams at computers 72 and 74 may perform their simulations off-line and subsequently reconnect to the simulation portal 38C and upload the output files from their respective simulations.

Once the simulation is complete, the simulation portal 38C may terminate, as illustrated in step 110. In one embodiment, the simulation portal 38C may continue running such that design teams may connect to the simulation portal 38C to simulate their designs with the SPICE™ output data files from previously designed components. Alternatively, the simulation portal 38C may be temporal and exist only for the time needed to complete the desired simulation.

FIG. 7 is a block diagram illustrating an exemplary computer system 150 which may be used in connection with various embodiments described herein. For example, the computer system 150 may be used to run a simulation on a remote site, or to provide connectivity, data storage, and other features useful for operating as a simulation portal 38 (or 38A, 38B, or 38C). However, other computer systems and/or architectures may be used, as will be clear to those skilled in the art.

The computer system 150 preferably includes one or more processors, such as processor 154. Additional processors may be provided, such as an auxiliary processor to manage input/output, an auxiliary processor to perform floating point mathematical operations, a special-purpose microprocessor having an architecture suitable for fast execution of signal processing algorithms ("digital signal processor"), a slave processor subordinate to the main processing system ("back-end processor"), an additional microprocessor or controller for dual or multiple processor systems, or a coprocessor. Such auxiliary processors may be discrete processors or may be integrated with the processor 154.

The processor 154 is preferably connected to a communication bus 152. The communication bus 152 may include a data channel for facilitating information transfer between storage and other peripheral components of the computer system 150. The communication bus 152 further may provide a set of signals used for communication with the processor 154, including a data bus, address bus, and control bus (not shown). The communication bus 152 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

Computer system 150 preferably includes a main memory 156 and may also include a secondary memory 158. The main memory 156 provides storage of instructions and data for programs executing on the processor 154. The main memory 156 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 158 may optionally include a hard disk drive 160 and/or a removable storage drive 162, for example a floppy disk drive, a magnetic tape drive, an optical disk drive, etc. The removable storage drive 162 reads from and/or writes to a removable storage unit 164 in a well-known manner. Removable storage unit 164 may be, for example, a floppy disk, magnetic tape, optical disk, etc. which is read by and/or written to by removable storage drive 162. The removable storage unit 164 includes a computer usable storage medium having stored therein computer software and/or data.

In alternative embodiments, secondary memory 158 may include other similar means for allowing computer programs or other instructions to be loaded into the computer system 150. Such means may include, for example, a removable storage unit 172 and an interface 170. Examples of secondary memory 158 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 172 and interfaces 170, which allow software and data to be transferred from the removable storage unit 172 to the computer system 150.

Computer system 150 may also include a communication interface 174. The communication interface 174 allows software and data to be transferred between computer system 150 and external devices, networks or information sources. Examples of some types of components that might comprise communication interface 174 include a modem, a network interface (such as an Ethernet card), a communications port, a PCMCIA slot and card, and an infrared interface, to name a few. Communication interface 174 preferably implements industry promulgated protocol standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement non-standard interface protocols as well. Software and data transferred via communication interface 174 are generally in the form of signals 178 which may be electronic, electromagnetic, optical or other signals capable of being received by communication interface 174. These signals 178 are provided to communication interface 174 via a channel 176. This channel 176 carries signals 178 and can be implemented using wire or cable, fiber optics, a phone line, a cellular phone link, a radio frequency (RF) link, or other communications channels.

Computer programming instructions (i.e., computer programs or software) are stored in the main memory 156 and/or the secondary memory 158. Computer programs can also be received via communication interface 174. Such computer programs, when executed, enable the computer system 150 to perform the features relating to the present invention as discussed herein.

In this document, the term "computer program product" is used to refer to any media used to provide programming instructions to the computer system 150. Examples of these media include removable storage units 164 and 172, a hard disk installed in hard disk drive 160, and signals 178. These computer program products are means for providing programming instructions to the computer system 150.

In an embodiment that is implemented using software, the software may be stored in a computer program product and loaded into computer system 150 using hard drive 160, removable storage drive 162, interface 170 or communication interface 174. The software, when executed by the processor 154, may cause the processor 154 to perform the features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will be apparent those skilled in the relevant art. Various embodiments may also be implemented using a combination of both hardware and software.

Figure 8:
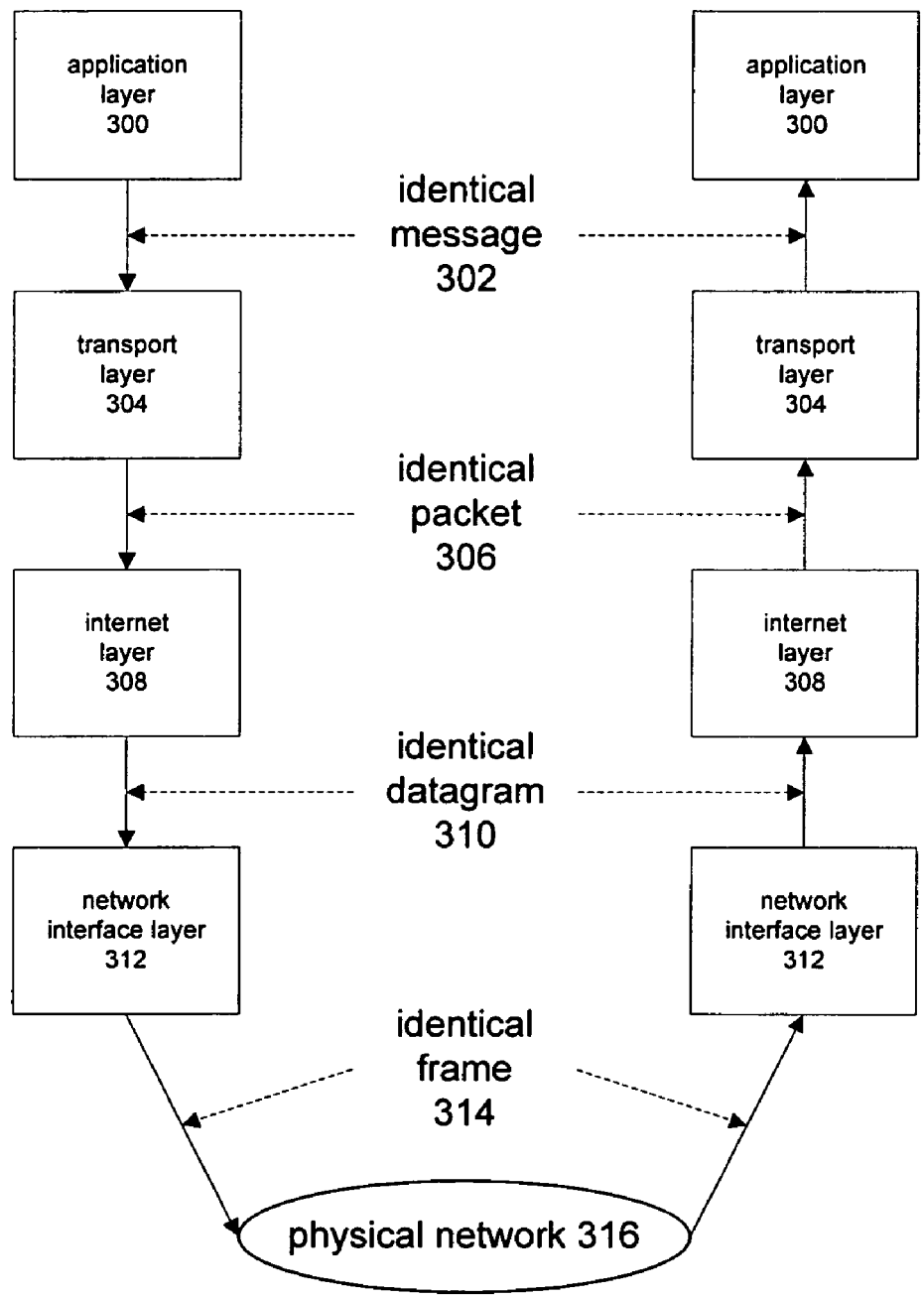
FIG. 8 is a block diagram illustrating a protocol layering principle useful in TCP/IP networking environments and applicable to certain embodiments described herein.

FIG. 8 is a block diagram illustrating a protocol layering principle widely used in TCP/IP networking environments. Messages passed from a first computer to a second computer may first travel down the protocol layers of the first computer, then travel across a network, and then travel up the protocol layers of the second computer.

For example, a communication from an application running on a first computer originates in application layer 300. This communication may be passed by the application as message 302 to the transport layer 304. The transport layer 304 may pass the message 302 as packet 306 to the internet layer 308. The internet layer 308 may then pass the packet 306 as datagram 310 to the network interface layer 312. The network interface layer 312 may then pass the datagram 310 as network specific frame 314 to the physical network 316.

The network specific frame 314 may travel across the physical network 316 or across multiple physical networks 316 to its destination in a second computer. Upon reaching its destination, the identical frame 314 may be received at the network interface layer 312. The network interface layer 312 may then pass the frame 314 as datagram 310 to the internet layer 308. The internet layer 308 may then pass the datagram 310 as packet 306 to the transport layer 304. The transport layer 304 may then pass the packet 306 as message 302 to application layer 300 where the message is received as a communication in an application. Frame 314, datagram 310, packet 306 and message 302 are identical when traveling between the protocol layers in a TCP/IP networking environment.

Figure 9:
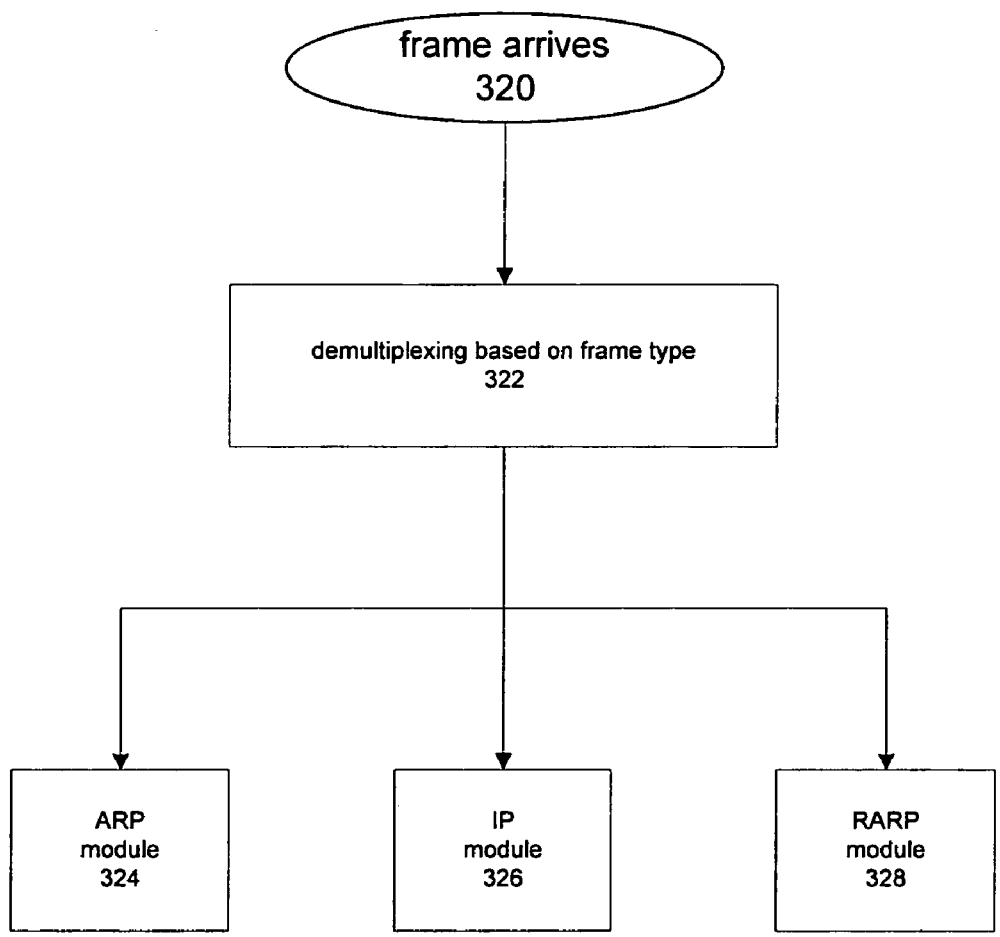
FIG. 9 is a flow diagram illustrating a technique for demultiplexing incoming data frames based on a protocol type found in a frame header.

FIG. 9 is a flow diagram illustrating a technique for demultiplexing incoming data packets, or frames, based on a protocol type found in the frame header. Communication protocols employ multiplexing and demultiplexing techniques between protocol layers in TCP/IP networking environments. For example, when sending a communication, the source computer may include additional information such as the message type, originating application, and protocols used. Eventually, all messages are placed into network frames for transfer and combined into a stream of data packets. At the receiving end, the destination computer uses the additional information in the network frame to guide the processing of the communication.

For example, in step 320, a frame arrives at the destination computer. Once the frame has been received, the frame is parsed to determine the frame's particular type, as illustrated in step 322. A frame may be one of a variety of frame types. Example frame types include, but are not limited to, address resolution protocol ("ARP"), internet protocol ("IP"), and reverse address resolution protocol ("RARP").

Once the frame type has been determined, the content of the frame is passed to a module that is capable of processing the datagram. For example, an ARP datagram may be passed to ARP module 324 for processing. Alternatively, if the frame type indicated an IP datagram, the IP datagram may be passed to IP module 326 for processing up to the next layer in the protocol stack. Additionally, a RARP datagram may be passed to RARP module 328 for processing.

Figure 10:
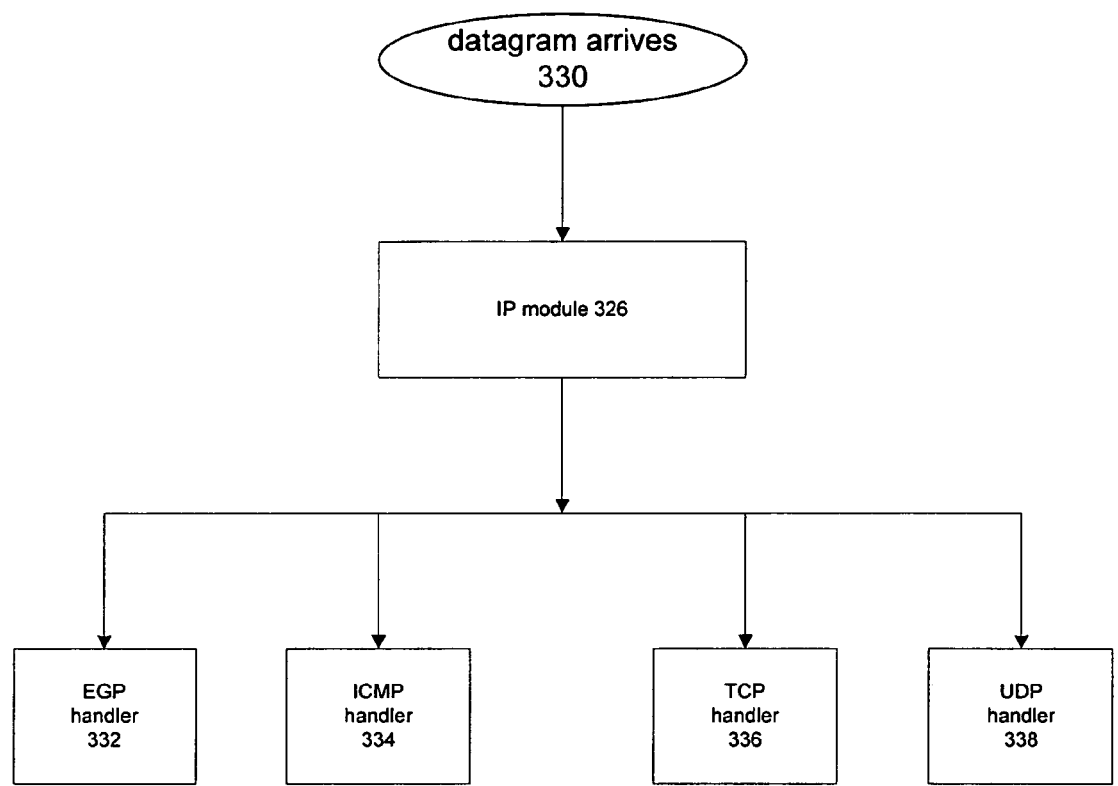
FIG. 10 is a flow diagram illustrating a technique for demultiplexing incoming datagrams based on a type found in a IP datagram header.

FIG. 10 is a flow diagram illustrating a technique for demultiplexing incoming datagrams based on a type found in the IP datagram header. Similar to the processing of frames, IP datagrams may be parsed to determine how to process the particular datagram. For example, in step 330 an IP datagram arrives and is routed to the appropriate module for processing. IP module 326 may parse the datagram to determine the datagram type. Example datagram types include, but are not limited to, internet control message protocol ("ICMP"), user datagram protocol ("UDP"), transport control protocol ("TCP"), and exterior gateway protocol ("EGP").

Once the datagram type has been determined, IP module 326 may select a protocol handler for the packet included in the datagram. For example, an EGP datagram may be forwarded to EGP handler 332. Similarly, an ICMP datagram may be forwarded to ICMP handler 334 while a TCP datagram may be sent to TCP handler 336 for processing up to the next layer in the protocol stack. Additionally, a UDP datagram may be sent to UDP handler 338 for processing.

Figure 11:
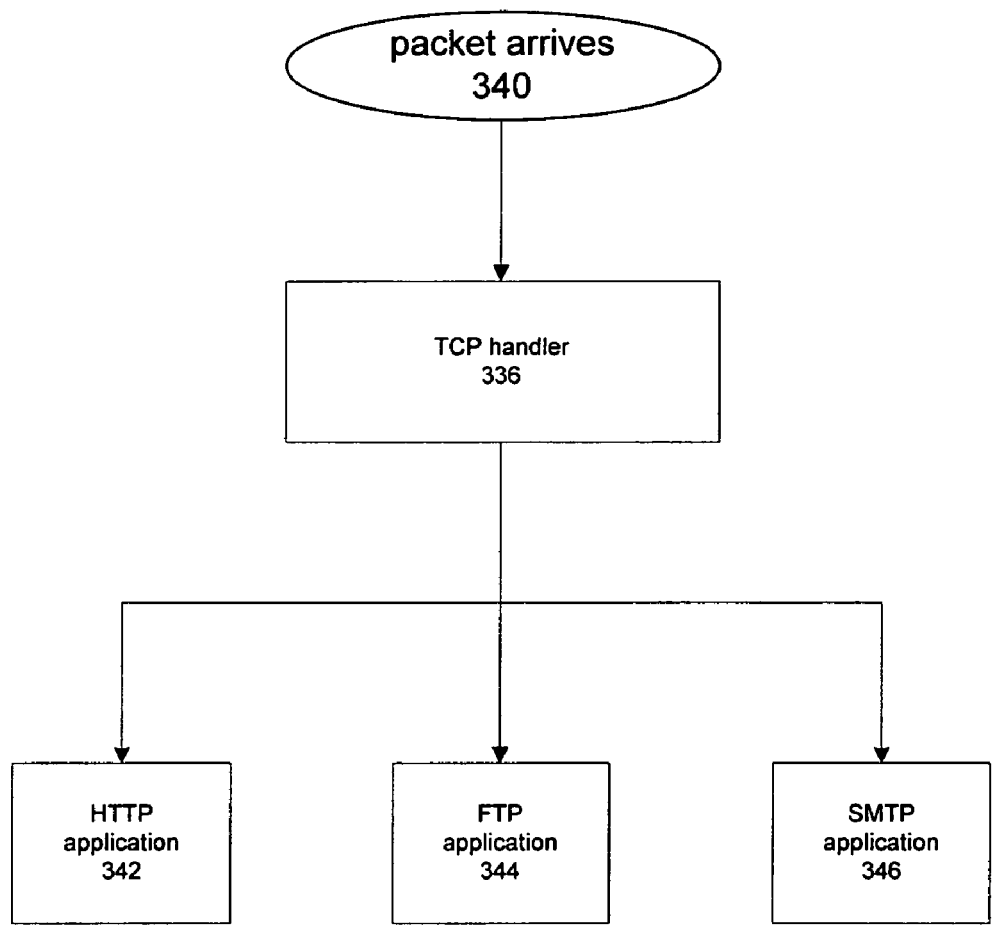
FIG. 11 is a flow diagram illustrating a technique for demultiplexing incoming data packets based on a type found in a TCP packet header.

FIG. 11 is a flow diagram illustrating a technique for demultiplexing incoming messages based on a type found in the TCP packet header. Similar to the processing of frames and datagrams, TCP messages may be parsed to determine which application is suited to receive the particular message type. For example, in step 340 a TCP message arrives and is routed to the TCP handler 336 for the appropriate processing. TCP handler 336 may parse the message to determine the message type and the particular originating application.

Example message types include, but are not limited to, hyper text transfer protocol ("HTTP"), file transfer protocol ("FTP"), and simple mail transfer protocol ("SMTP"). An extensive set of applications are commercially available for use with these and other message types. For example, Netscape Navigator and Microsoft Explorer are applications that use HTTP messages; WFTP is an application that uses FTP messages, and Eudora and Microsoft Outlook are applications that use SMTP messages. Additional examples of applications are well known, although not mentioned herein.

Once the message type has been determined by TCP handler 336, the message may be routed to the appropriate application for processing. For example, an HTTP message may be forwarded to HTTP application 342. Similarly, an FTP message may be forwarded to FTP application 344 while an SMTP message may be sent to SMTP application 346 for processing by the application and possibly delivery to an end user.

While the particular systems and methods shown and described herein are fully capable of attaining various advantages provided by the invention, it is to be understood that the descriptions and drawings represent the presently preferred embodiments of the invention and are, as such, a representative of the subject matter which is broadly contemplated by the present invention. It is to be further understood that the scope of the present invention fully encompasses other embodiments that will be apparent to those skilled in the art, and that the scope of the present invention is accordingly limited only by any appended claims.

What is claimed is:

1. A method for facilitating a collaborative circuit design simulation between a first simulation engine and at least a second simulation engine, wherein said simulation engines are communicatively coupled together with a simulation portal over a computer network, said method comprising:

creating said simulation portal openly accessible to said first and second simulation engines connected to said computer network;

accepting a connection to said simulation portal by each of said first simulation engine and said second simulation engine;

receiving a circuit design simulation output file at said simulation portal from said first simulation engine; and providing said circuit design simulation output file from said simulation portal upon request to said second simulation engine.

2. The method of claim 1 wherein said creating said simulation portal further comprises:

creating said simulation portal using XML; and configuring said simulation portal to allow connections from each of said simulation engines connected to said computer network.

3. The method of claim 1 further comprising managing circuit design simulation output files for multiple simulations running contemporaneously.

4. The method of claim 1 wherein accepting said connection further comprises:

verifying said connection with a username and password combination.

5. A system for performing circuit simulations wherein a first simulation engine and at least a second simulation engine are communicatively coupled together with a simulation portal over a computer network, said system comprising:

means for creating said simulation portal;

means for accepting connections to said simulation portal from each of said first simulation engine and said second simulation engine;

means for receiving at said simulation portal one or more circuit design simulation output files from said first simulation engine; and means for providing said one or more circuit design simulation output files from said simulation portal upon request to said second simulation engine.

6. The system of claim 5 wherein said means for creating said simulation portal include creating said simulation portal in XML.

7. The system of claim 5 wherein said means for accepting connections includes verifying said connections with a username and password combination.

8. A computer program product embodied on computer readable medium usable by a processor, the medium having stored thereon a sequence of instructions which, when executed by said processor, causes said processor to execute a method for facilitating a collaborative circuit design simulation between a first simulation engine and at least a second simulation engine, wherein said first and said second simulation engines are communicatively coupled with a simulation portal over a computer network, said computer program product comprising:

instructions for making said simulation portal openly accessible to said simulation engines over said computer network;

instructions for accepting a connection to said simulation portal from each of said first simulation engine and said second simulation engine;

instructions for receiving a circuit design simulation output file uploaded from at least said first simulation engine; and instructions for providing said circuit design simulation output file to at least said second simulation engine upon request.

9. The computer program product of claim 8 further comprising instructions for managing circuit design simulation output files for multiple simulations running contemporaneously.

10. The computer program product of claim 8 wherein said instructions for accepting said connection further comprise instructions for verifying said connection with a username and password combination.

11. A method for optimizing components in a system design comprising:
   creating a simulation portal that is openly accessible over a computer network;
   accepting a connection to said simulation portal from each of a plurality of design teams communicatively coupled together with said simulation portal over said computer network;
   receiving a circuit design simulation output file at said simulation portal from at least one of said plurality of design teams connected to said simulation portal;
   providing at least one of said circuit design simulation output files from said simulation portal to at least one other of said design teams connected to said simulation portal; and
   selecting the optimal components for said system design based on a comparison of said circuit design simulation output files.

12. The method of claim 11 wherein accepting said connection further comprises verifying said connection with a username and password combination.

13. The method of claim 11 wherein said design teams are not connected to the simulation portal at the same time.

14. The method of claim 11, further comprising terminating said connection to said simulation portal from any of said plurality of design teams upon request.

15. A simulation portal comprising:
   a data storage repository, capable of storing data for each of a plurality of circuit design simulations;
   a communications server, allowing a plurality of simulation engines to connect to the portal and to participate in one or more of the plurality of circuit design simulations; and
   a simulation controller, managing and synchronizing communications between the participating simulation engines,
   the portal being created dynamically.

16. The portal of claim 15, wherein the simulation controller manages simulation data for multiple circuit design simulations running contemporaneously.

17. The portal of claim 15, wherein the data includes a synchronization file to allow the participating simulation engines to match timing steps, said data associated with each of the circuit design simulations available to any simulation engine participating in the circuit design simulation.

18. The portal of claim 17, wherein the synchronization file is updated by each simulation engine participating in the circuit design simulation as it simulates.

19. The portal of claim 15, wherein the plurality of simulation engines includes any web enabled engine.

20. The portal of claim 15, wherein the simulation controller verifies a username and password combination.

21. The portal of claim 15, wherein the communication server allows each simulation engine to disconnect from the portal upon request.

22. The portal of claim 15, wherein the plurality of simulation engines are not connected to the portal at the same time.

23. The portal of claim 15, wherein the portal is terminated dynamically, by writing programming files and executing those files.

24. The portal of claim 15, wherein the programming files are written in XML.

25. The portal of claim 15, wherein the communications between the participating simulation engines and the portal uses XML.

26. The portal of claim 15, wherein the portal is created by an entity not participating in the circuit design simulation.

27. A method for conducting a collaborative circuit design simulation of a circuit design, comprising:
   a) dynamically creating a portal by writing programming files in XML and executing those files;
   b) granting access to the portal to a plurality of simulation engines;
   c) receiving a circuit design simulation output file associated with a first portion of the circuit design from a first of said plurality of simulation engines;
   d) storing the circuit design simulation output file in a storage area, said output file available to any of said plurality of simulation engines;
   e) sending the circuit design simulation output file to each of said plurality of simulation engines upon request, at least a second of said plurality of simulation engines performing a circuit design simulation for a second portion of the circuit design using the output file as input; and
   f) repeating c) through e) until the circuit design has been simulated.

28. The method of claim 27, further comprising, g) terminating the portal by executing one or more XML statements.

29. The method of claim 27, wherein the storage area includes a synchronization file associated with the circuit design simulation to allow participating simulation engines to match timing steps.

30. The method of claim 29, wherein the synchronization file is updated by each simulation engine as it simulates.

31. The method of claim 27, wherein each simulation engine terminates access to the portal after its output file is received.

32. The method of claim 27, wherein the portal is created by an entity not participating in the circuit design simulation.

33. The method of claim 27, wherein the portal is created by an entity participating in the circuit design simulation.

34. The method of claim 27, wherein granting access to the portal comprises verifying a username and password combination.

35. The method of claim 27, wherein the simulation output file includes an industry standard output format.

36. The method of claim 27, wherein the circuit design simulation output file includes a vendor specific output file format.

37. The method of claim 27, wherein receiving the circuit design simulation output file includes receiving circuit design output files from multiple circuit design simulations running contemporaneously.

38. A circuit design simulation system comprising:
   a portal comprising a storage area to store data used in each of a plurality of circuit design simulations; and
   a plurality of simulation engines in communication with the portal, the plurality of simulation engines able to send circuit design simulation output files to the portal and able to receive any of the circuit design simulation output files from the portal.

39. The system of claim 38, wherein the plurality of simulation engines are not in communication with the portal at the same time.

40. The system of claim 38, wherein the communications with the portal uses XML.

41. The system of claim 38, wherein the communications with the portal requires the verification of a username and password combination.

42. The system of claim 38, wherein the stored data includes a synchronization file to allow simulation engines participating in the circuit design simulation to match timing steps.

43. The method of claim 38, wherein the synchronization file is updated by each simulation engine as it simulates.

44. A circuit design simulation system comprising:
- a portal comprising a storage area to store data for use in a plurality of circuit design simulations; and
- a plurality of web-enabled simulation engines in communication with the portal, the web-enabled simulation engines being in communication with each other so that a circuit design simulation output file generated by a first simulation engine can be sent as a circuit design input file to a second simulation engine.

* * * * *